(12) United States Patent
Johns

(10) Patent No.: US 6,598,561 B1
(45) Date of Patent: Jul. 29, 2003

(54) SQUIRREL PROOF BIRD FEEDER

(76) Inventor: Troy C. Johns, 2536 Blackmon Dr., Decatur, GA (US) 30033

( * ) Notice: Subject to any disclaimer, the term of this patent is extended or adjusted under 35 U.S.C. 154(b) by 0 days.

(21) Appl. No.: 10/259,151

(22) Filed: Sep. 27, 2002

(51) Int. Cl.[7] .............................................. A01K 61/02
(52) U.S. Cl. ..................... 119/57.9; 119/52.3
(58) Field of Search .............................. 119/52.2, 52.3, 119/57.8, 57.9

(56) References Cited

U.S. PATENT DOCUMENTS

| | | | | |
|---|---|---|---|---|
| 3,126,870 A | * | 3/1964 | Matthew | 119/57.9 |
| 3,230,932 A | * | 1/1966 | Etnyre | 119/57.9 |
| 4,207,839 A | * | 6/1980 | Barry | 119/57.9 |
| 5,063,877 A | * | 11/1991 | Riggi | 119/52.2 |
| 5,165,364 A | * | 11/1992 | Horkey | 119/57.8 |
| 5,676,089 A | * | 10/1997 | Morganson | 119/52.3 |
| 6,192,832 B1 | * | 2/2001 | Husnik | 119/57.9 |

* cited by examiner

Primary Examiner—Charles T. Jordan
Assistant Examiner—Elizabeth Shaw
(74) Attorney, Agent, or Firm—Harry I. Leon; Vivian L. Steadman

(57) ABSTRACT

A bird feeder which includes a cylindrically shaped outer shell. The shell is free to move about a structure having first and second generally drum-like faces. The first drum-like face defines a feeding trough and access to a storage chamber. Attached to the second drum-like face is means for mounting the feeder so that both faces are disposed generally vertically. Whereas birds can feed while resting on perches which protrude outwardly from the first drum-like face, non-flying predatory animals such as squirrels must approach the feeder along its outer periphery, traversing the shell in the process. As the predator tries to climb onto the feeder, the outer shell spins; and the animal loses both its footing and any chance of using the feeder. The storage chamber can be easily filled without removing the bird feeder from its mounting. A funnel connects the storage chamber with the feeding trough to insure a smooth flow of bird feed from the chamber to the trough.

3 Claims, 4 Drawing Sheets

SQUIRREL PROOF BIRD FEEDER

BACKGROUND OF THE INVENTION

The present invention relates to devices for feeding seed to birds and particularly to such devices which guard the seed against squirrels and other predators by using a movable barrier.

Among the prior art devices which include such a movable barrier is a feeder described by Ancketill. Specifically, in U.S. Pat. No. 5,195,495, which issued Mar. 23, 1993, Ancketill teaches a feeder which is closed by the weight of a squirrel or the like as the animal climbs onto the feeder. A more radical approach was taken by Ricketts in U.S. Pat. No. 5,170,750, which issued Dec. 15, 1992. Ricketts' combination includes a latch which, once tripped by the weight of a squirrel or similar creature, releases a spring loaded door, catapulting the predator from the feeder. Vandiver, U.S. Pat. No. 4,867,104, which issued Sep. 19, 1989, offers a pole supported feeder, the base of which has small rotatable elements which make access to the feed container difficult for a predator.

SUMMARY OF THE INVENTION

The object of this invention is to provide an improved bird feeder which cannot be accessed by squirrels or the like.

An additional object of the invention is to provide a bird feeder for the amusement of its owner as he observes birds feeding from it and the foiled attempts of squirrels to reach the bird feed.

The improved bird feeder comprises a feed storage structure in the general shape of a short cylinder and a rotating wheel with a cylindrically shaped shell which moves about the sidewall of this structure and in close proximity thereto. A generally drum-like face of the feed storage structure includes a feeding trough which is kept filled by gravity. Funnel-like elements within the feed storage structure channel bird seed to the trough.

The rotating wheel comprises a barrier on which squirrels and the like cannot gain footing; and as a consequence, the attempts of non-flying predators to reach the feeding trough end in failure.

Alternately, the improved bird feeder includes a rotating wheel in which is attached a disk. The rotating disk barrier provided by this combination makes access to the feeding trough even more difficult for squirrels.

DETAILED DESCRIPTION OF THE PREFERRED EMBODIMENTS

Figure 1:
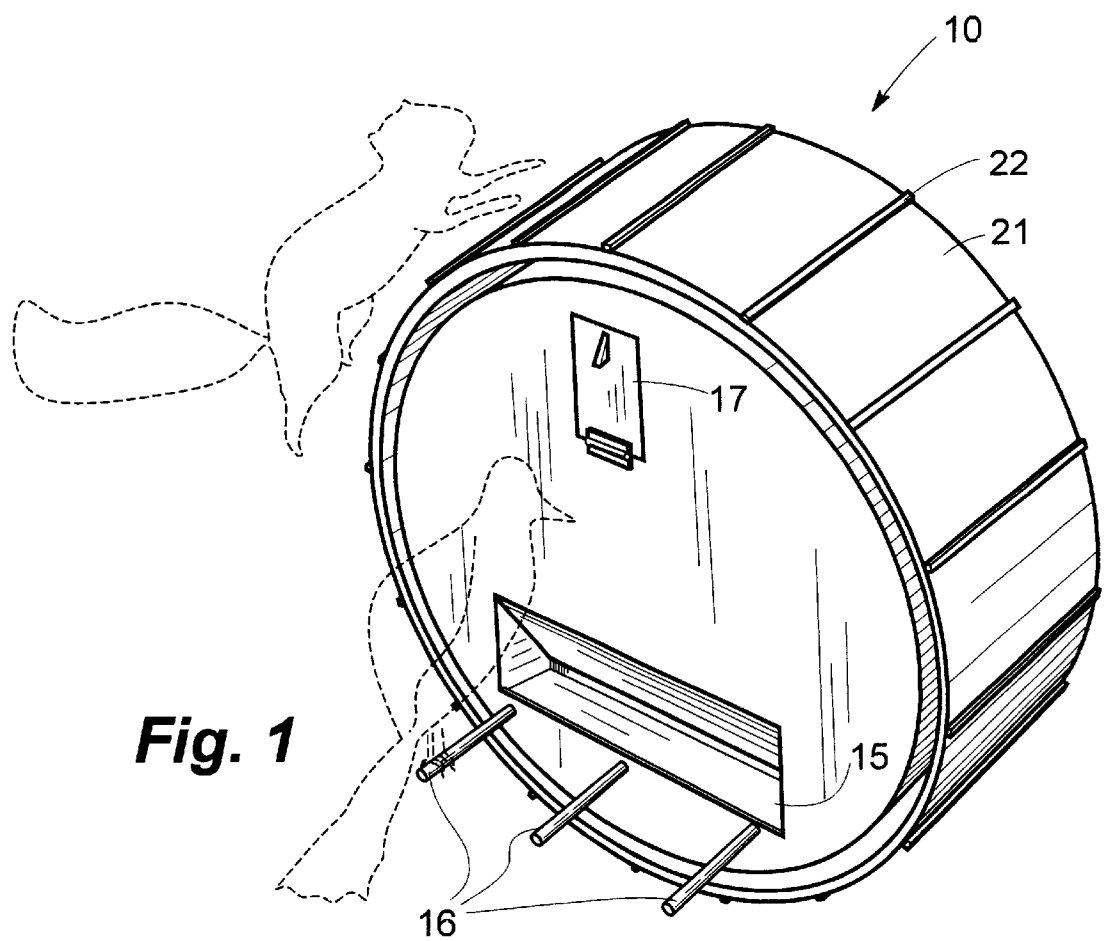
FIG. 1 is an top right side perspective view of the bird feeder according to the present invention, the bird and the squirrel in the drawings being shown for illustrative purposes only and forming no part of the invention.

In the drawings, an improved bird feeder is indicated generally by the reference numeral 10. The feeder 10 comprises a rotating wheel 13, an elongated shaft 14, and a feed storage structure 12 having first and second generally drum-like faces 11, 18 (FIGS. 1 through 5). The wheel 13 includes a cylindrically shaped shell 22 to which is affixed a plurality of traction grips 22; the shell is free to move about the structure 12. Both the wheel 13 and feed storage structure 12 are preferably fabricated of plastic.

Figure 3:
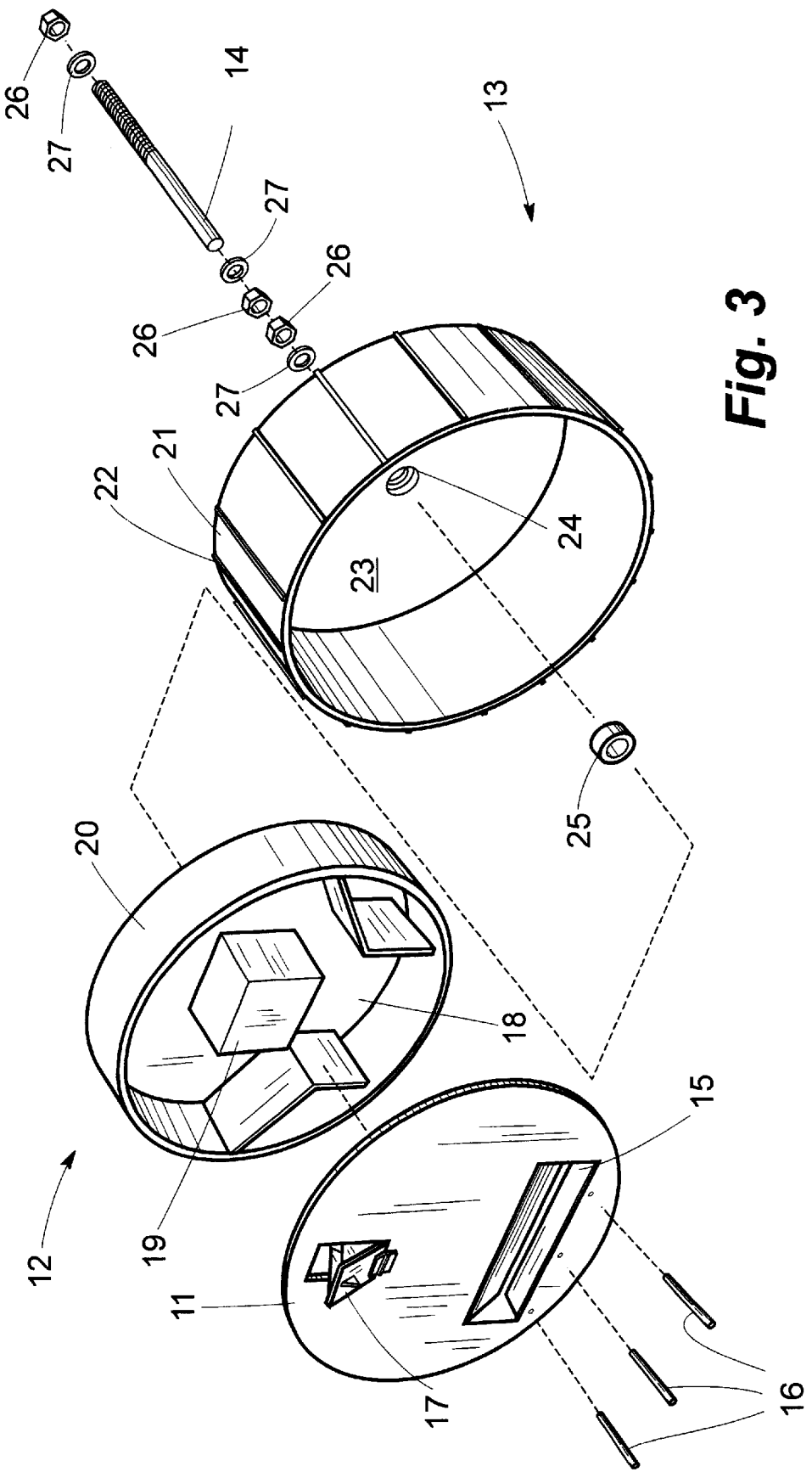
FIG. 3 is an exploded perspective view of the bird feeder according to FIG. 1.
Figure 4:
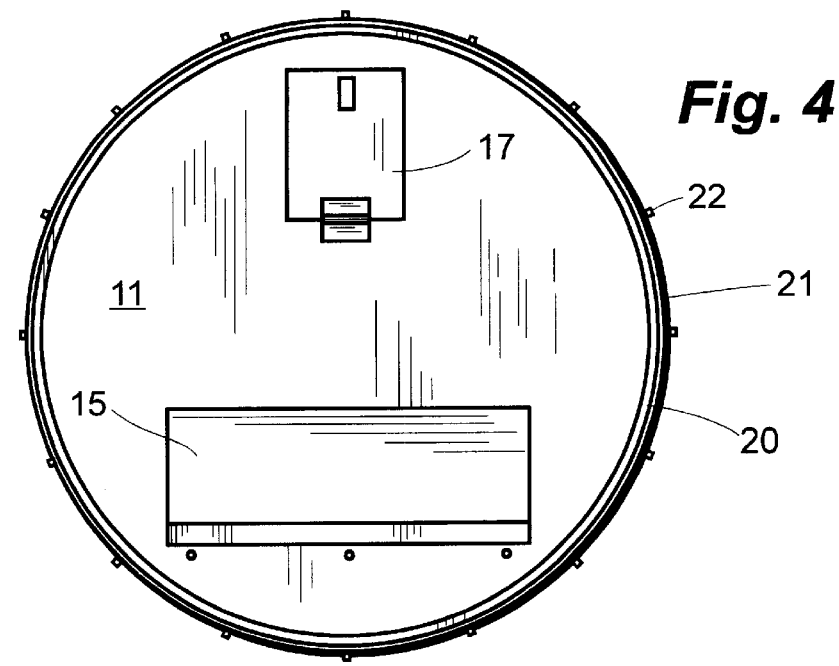
FIG. 4 is a side elevational of the bird feeder according to FIG. 1.

The first drum-like face 11 defines an elongated feeding trough 15, a plurality of perches 16 and a feed storage refill door 17 with a funnel support (FIGS. 1 and 3). In the assembled bird feeder 10, the first drum-like face 11 is either glued or mechanically fastened to the feed storage structure 12. Mounted within the feed storage structure 12 are funnel-like elements which channel bird seed and the like downwardly towards the feeding trough 15 (FIG. 3). The feeding trough 15 is kept full by gravity discharges of feed stored within the structure 12.

Figure 5:
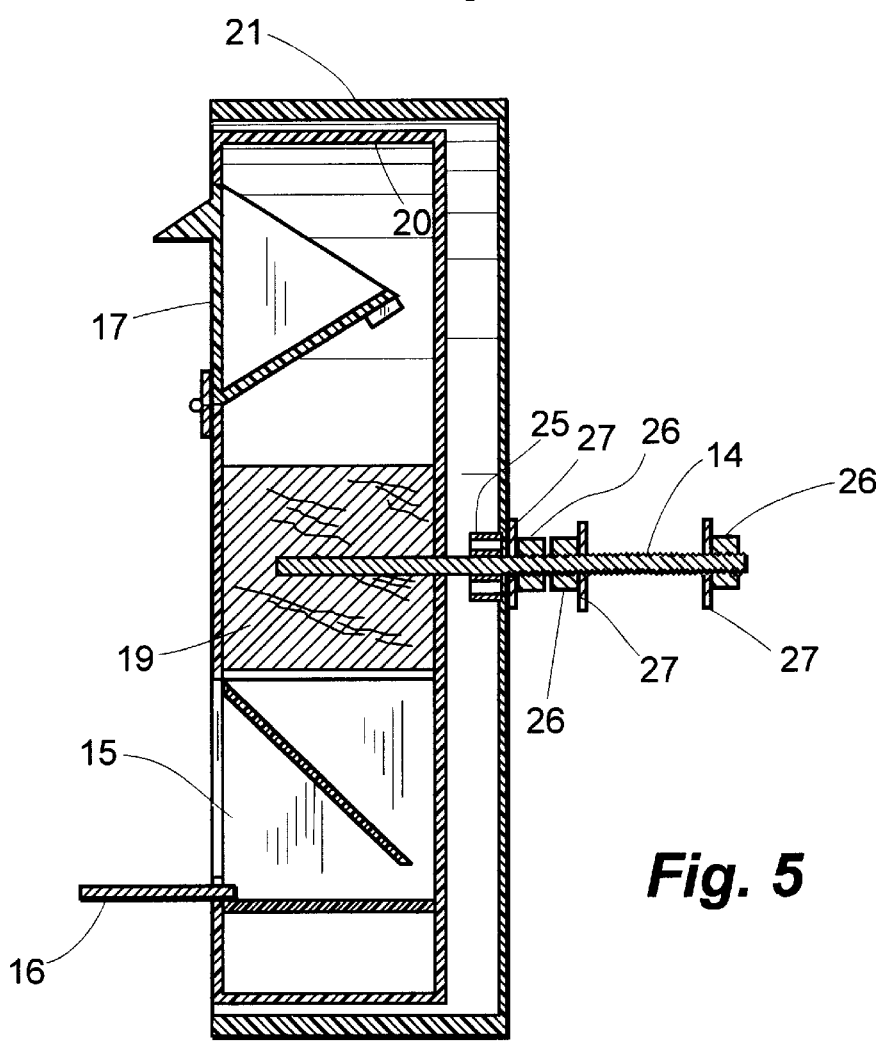
FIG. 5 is a cross-sectional view of the bird feeder taken on line 5—5 of FIG. 2.

Attached to the second drum-like face 18 is means, including the shaft 14 and an axle block 19, for mounting the feeder 10 so that both faces are disposed generally vertically (FIGS. 3 and 5). As is illustrated in FIG. 5, a first end of the shaft 14 is rigidly attached to the axle block 19.

In addition to the cylindrically-shaped shell 21, the rotating wheel 14 includes a support wall 23 which defines a hole 24 (FIG. 3). Mounted on the wall 23 and in alignment with the hole 24 is a bearing 25 for slideably receiving the shaft 14, so that it can support the rotating wheel 13.

Figure 2:
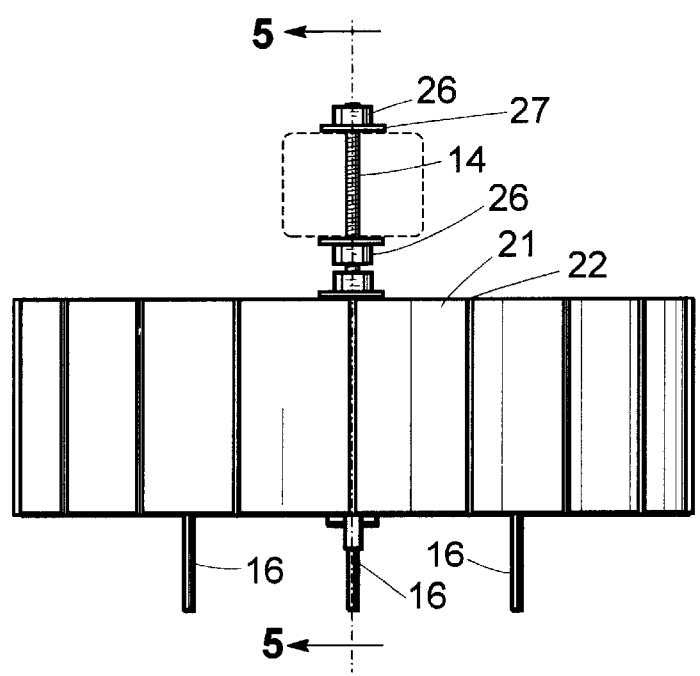
FIG. 2 is a top plan view of the bird feeder according to FIG. 1, a cross-section of a tree or pole on which the bird feeder is mounted being illustrated by dashed lines and forming no part of the invention.

Distal from the first end, the shaft 14 is preferably threaded (FIGS. 2 and 3). Nuts 26 and washers 27 can then be used to hold both the rotating wheel 13 on the shaft 14 and the assembled bird feeder 10 on its mounting. As indicated by dashed lines in FIG. 2, the feeder 10 can be mounted on a a pole or tree branch using a protruding portion of the elongated shaft 14 (FIG. 2). The bird feeder 10 can be easily filled without removing it from its mounting.

Whereas birds can feed while resting on the perches 16 which protrude outwardly from the first drum-like face 11, non-flying predatory animals such as squirrels must approach the feeder 10 along its outer periphery, traversing the shell 21 in the process. As the predator tries to climb onto the feeder 10, the shell 21 spins; and the animal loses both its footing and any chance of using the feeder 10.

Figure 6:
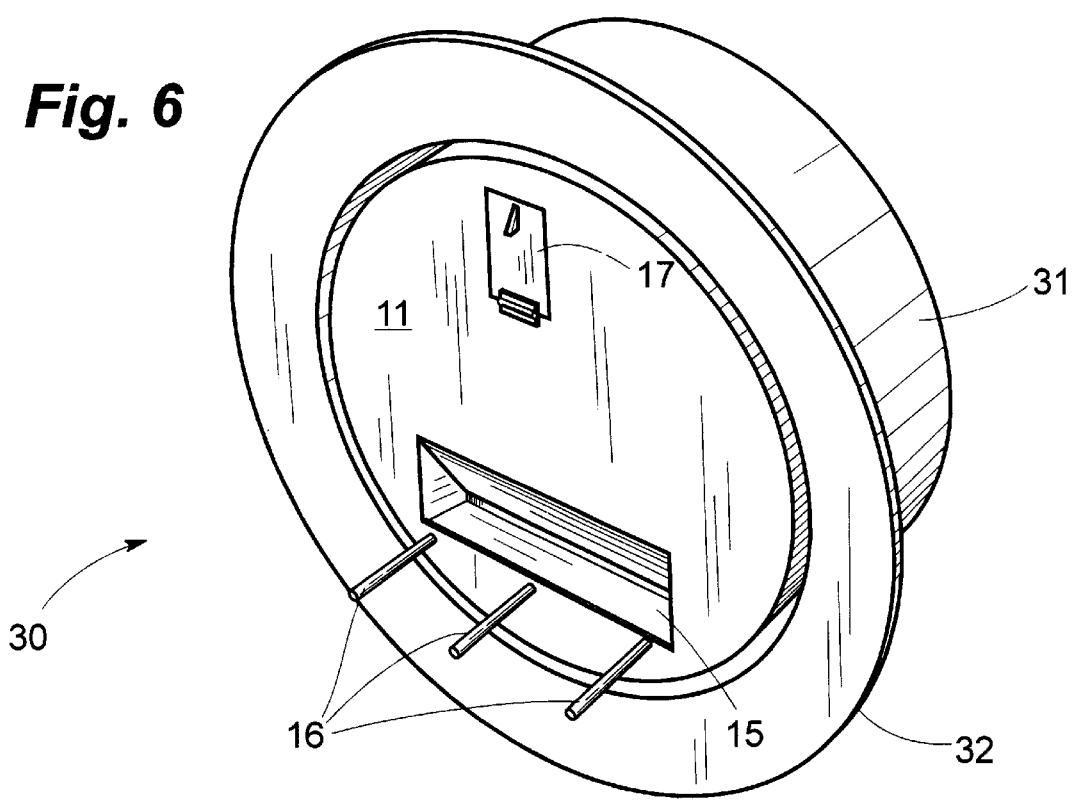
FIG. 6 is a top right side perspective view of an alternate embodiment of the bird feeder according to the present invention.
Figure 7:
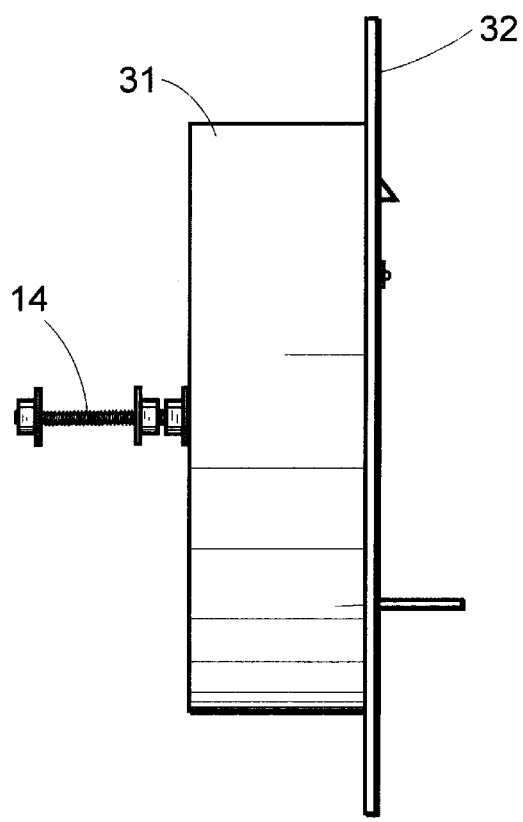
FIG. 7 is an elevational view of the bird feeder according to FIG. 6.

An alternate embodiment of the improved bird feeder is shown in FIGS. 6 and 7. A bird feeder 30 includes a rotating wheel 31 which has a disk barrier 32. Other elements of the feeder 30 are the same as in the bird feeder 10.

Any such applications, modifications or changes which fall within the purview of the description are intended to be illustrative and not intended to be limitative. The scope of the invention is limited only by the scope of the claims appended hereto.

What is claimed is:

1. A device for feeding birds while simultaneously denying access by squirrels and the like to the bird feed, comprising:

(a) a stationary feed storage container, a sidewall and a generally drum-like face which extends perpendicularly thereto, the drum-like face defining a feeding trough;

(b) at least one perch mounted on the drum-like face proximate with the feeding trough, so that birds resting on the perch can eat from the trough; and (c) a cylindrically shaped shell rotatably mounted on the feed storage container, the shell rotating about the sidewall when a squirrel, trying to get to the feeding trough, climbs onto the shell, so that the squirrel tends to lose its footing.

2. The device according to claim 1 which further comprises a shaft affixed to the feed storage container and a bearing mounted on the cylindrically shaped shell, the bearing having a plastic surface for slideably receiving the shaft when the shaft is disposed along the centerline of the cylindrically shaped shell, so that the shell can rotate freely about the shaft.

3. The device according to claim 1, which further comprises a disk barrier, the disk barrier being affixed to the cylindrically shaped shell and extending perpendicularly to the centerline thereof, so as to hinder a squirrel trying to get to the feeding trough.

* * * * *